United States Patent
Yuan et al.

(10) Patent No.: US 7,804,184 B2
(45) Date of Patent: Sep. 28, 2010

(54) SYSTEM AND METHOD FOR CONTROL OF A GRID CONNECTED POWER GENERATING SYSTEM

(75) Inventors: Xiaoming Yuan, Shanghai (CN); Allen Michael Ritter, Roanoke, VA (US); Haiqing Weng, Shanghai (CN); Robert William Delmerico, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/358,327

(22) Filed: Jan. 23, 2009

(65) Prior Publication Data
US 2010/0142237 A1  Jun. 10, 2010

(51) Int. Cl.
F03D 9/00 (2006.01)
H02P 9/04 (2006.01)
F03B 13/10 (2006.01)
F03B 13/12 (2006.01)
F03B 13/00 (2006.01)
F01D 15/10 (2006.01)
F02C 6/00 (2006.01)
H02K 7/18 (2006.01)

(52) U.S. Cl. ................................ 290/44; 290/55
(58) Field of Classification Search .............. 290/43, 290/44, 52, 53, 54, 55
See application file for complete search history.

(56) References Cited

U.S. PATENT DOCUMENTS

| | | | | |
|---|---|---|---|---|
| 3,829,706 A | * | 8/1974 | Seip ........................ | 307/147 |
| 3,959,719 A | * | 5/1976 | Espelage ................... | 323/207 |
| 3,959,720 A | * | 5/1976 | Bose et al. ................ | 323/207 |
| 3,982,167 A | * | 9/1976 | Espelage ................... | 363/165 |
| 4,400,659 A | | 8/1983 | Barron et al. ............... | 322/32 |
| 4,482,031 A | * | 11/1984 | Yoshida et al. ............. | 187/296 |
| 4,511,835 A | * | 4/1985 | Studtmann ................. | 318/700 |
| 4,682,278 A | * | 7/1987 | Marquardt et al. .......... | 363/58 |
| 4,994,684 A | | 2/1991 | Lauw et al. ................ | 290/52 |

(Continued)

FOREIGN PATENT DOCUMENTS

WO    00/73652 A1    12/2000

OTHER PUBLICATIONS

P.W. Carlin, A.S. Laxson, E.B. Muljadi; "The History and State of the Art of Variable-Speed Wind Turbine Technology"; Feb. 2001; National Renewable Energy Laboratory/TP-500-28607; 68Pages.

(Continued)

*Primary Examiner*—T C Patel
*Assistant Examiner*—Pedro J Cuevas
(74) *Attorney, Agent, or Firm*—Ann M. Agosti

(57) ABSTRACT

A system for controlling a grid connected power generating system is provided. The system includes a wind turbine, a converter, a first controller and a second controller. The wind turbine supplies electrical power to a power grid and the converter couples the wind turbine to the power grid. The first controller calculates voltage commands to emulate a phasor back electromotive force behind an inductance. The controller further generates converter switching commands from the voltage commands. The voltage commands include a voltage magnitude reference and an internal frequency reference calculated from a power imbalance between an active power reference and the electrical power. The second controller is used to limit a converter current.

20 Claims, 9 Drawing Sheets

U.S. PATENT DOCUMENTS

| | | | |
|---|---|---|---|
| 5,028,804 A | 7/1991 | Lauw | 290/40 C |
| 5,534,763 A * | 7/1996 | Williams et al. | 318/799 |
| 5,745,352 A * | 4/1998 | Sandri et al. | 363/41 |
| 5,793,167 A * | 8/1998 | Liang et al. | 318/141 |
| 5,793,179 A * | 8/1998 | Watkins | 318/701 |
| 5,798,633 A | 8/1998 | Larsen et al. | 323/207 |
| 5,821,708 A * | 10/1998 | Williams et al. | 318/400.34 |
| 5,859,513 A * | 1/1999 | Stephens et al. | 318/430 |
| 5,880,550 A * | 3/1999 | Fukao et al. | 310/179 |
| 6,081,084 A * | 6/2000 | Crecelius | 318/400.35 |
| 6,137,187 A * | 10/2000 | Mikhail et al. | 290/44 |
| 6,239,582 B1 | 5/2001 | Buzan et al. | 322/20 |
| 6,373,211 B1* | 4/2002 | Henry et al. | 318/432 |
| 6,392,418 B1* | 5/2002 | Mir et al. | 324/503 |
| 6,420,795 B1* | 7/2002 | Mikhail et al. | 290/44 |
| 6,465,975 B1* | 10/2002 | Naidu | 318/430 |
| 6,498,449 B1* | 12/2002 | Chen et al. | 318/434 |
| 6,549,871 B1* | 4/2003 | Mir et al. | 702/145 |
| 6,653,829 B1* | 11/2003 | Henry et al. | 324/207.21 |
| 6,693,809 B2 | 2/2004 | Engler | 363/71 |
| 6,847,128 B2* | 1/2005 | Mikhail et al. | 290/44 |
| 6,856,039 B2* | 2/2005 | Mikhail et al. | 290/44 |
| 6,900,998 B2 | 5/2005 | Erickson et al. | 363/159 |
| 7,042,227 B2* | 5/2006 | Mir et al. | 324/503 |
| 7,072,790 B2* | 7/2006 | Hu et al. | 702/147 |
| 7,095,131 B2* | 8/2006 | Mikhail et al. | 290/44 |
| 7,095,133 B2* | 8/2006 | Kimura et al. | 290/52 |
| 7,119,530 B2* | 10/2006 | Mir et al. | 324/76.15 |
| 7,157,804 B2* | 1/2007 | Kimura et al. | 290/52 |
| 7,157,878 B2* | 1/2007 | Collier-Hallman | 318/567 |
| 7,208,908 B2* | 4/2007 | Anghel | 318/400.02 |
| 7,215,035 B2 | 5/2007 | Hudson et al. | 290/44 |
| 7,253,537 B2* | 8/2007 | Weng et al. | 290/44 |
| 7,271,500 B1* | 9/2007 | Kimura et al. | 290/52 |
| 7,304,400 B2* | 12/2007 | Kang et al. | 290/44 |
| 7,323,833 B2* | 1/2008 | Mir | 318/100 |
| 7,423,412 B2* | 9/2008 | Weng et al. | 322/20 |
| 7,425,771 B2* | 9/2008 | Rivas et al. | 290/44 |
| 7,476,987 B2 | 1/2009 | Chang | 290/55 |
| 7,521,887 B2* | 4/2009 | Tobari et al. | 318/717 |
| 7,577,545 B2* | 8/2009 | Hu | 702/151 |
| 7,615,880 B2* | 11/2009 | Kikuchi et al. | 290/44 |
| 7,667,439 B2* | 2/2010 | Gertmar et al. | 322/47 |
| 7,692,323 B2* | 4/2010 | Ichinose et al. | 290/44 |
| 7,692,325 B2* | 4/2010 | Ichinose et al. | 290/44 |
| 7,701,087 B2* | 4/2010 | Eckroad et al. | 307/46 |
| 7,723,932 B2* | 5/2010 | King et al. | 318/139 |
| 7,728,451 B2* | 6/2010 | Ichinose et al. | 290/44 |
| 7,728,537 B2* | 6/2010 | Tomigashi | 318/400.02 |
| 7,733,066 B2* | 6/2010 | Ichinose et al. | 322/29 |
| 2001/0012211 A1* | 8/2001 | Hasegawa et al. | 363/131 |
| 2002/0105335 A1* | 8/2002 | Mir et al. | 324/503 |
| 2004/0095089 A1* | 5/2004 | Collier-Hallman | 318/567 |
| 2005/0151502 A1* | 7/2005 | Quirion | 318/715 |
| 2005/0151504 A1* | 7/2005 | Kimura et al. | 318/807 |
| 2006/0006829 A1* | 1/2006 | Anghel | 318/719 |
| 2006/0052972 A1* | 3/2006 | Hu et al. | 702/147 |
| 2006/0138980 A1* | 6/2006 | Kimura et al. | 318/140 |
| 2006/0176059 A1* | 8/2006 | Mir et al. | 324/503 |
| 2007/0040524 A1* | 2/2007 | Sarlioglu et al. | 318/438 |
| 2007/0108937 A1* | 5/2007 | Mir | 318/807 |
| 2007/0126391 A1* | 6/2007 | Tobari et al. | 318/717 |
| 2007/0290506 A1 | 12/2007 | Walling | 290/44 |
| 2008/0300820 A1* | 12/2008 | Hu | 702/147 |
| 2009/0058329 A1* | 3/2009 | Ichikawa | 318/139 |
| 2009/0067202 A1* | 3/2009 | Ichikawa et al. | 363/79 |
| 2009/0231893 A1* | 9/2009 | Esmaili et al. | 363/79 |
| 2010/0057268 A1* | 3/2010 | Smith et al. | 700/298 |
| 2010/0060001 A1* | 3/2010 | Gabrys | 290/44 |
| 2010/0060002 A1* | 3/2010 | Gabrys | 290/44 |
| 2010/0102560 A1* | 4/2010 | Ichinose et al. | 290/44 |
| 2010/0102762 A1* | 4/2010 | Sugimoto et al. | 318/376 |
| 2010/0133816 A1* | 6/2010 | Abolhassani et al. | 290/44 |
| 2010/0138182 A1* | 6/2010 | Jammu et al. | 702/113 |
| 2010/0142237 A1* | 6/2010 | Yuan et al. | 363/97 |

OTHER PUBLICATIONS

G. Iwanski & W.Koczara ; "Island operation of the variable speed induction generator"; Power Electronics and Motion Control Conference, 2004. IPEMC 2004. The 4th International; Publication Date: Aug. 14-16, 2004; vol. 2, On pp. 896-901.

J. Soens, J. Driesen, R. Belmans; "Interaction between Electrical Grid Phenomena and the Wind Turbine's Behaviour"; Proceedings of ISMA2004; Available from Internet<http://www.kuleuven.be/ei/Public/publications/EIWP04-08.pdf>; pp. 3969-3988.

* cited by examiner

SYSTEM AND METHOD FOR CONTROL OF A GRID CONNECTED POWER GENERATING SYSTEM

BACKGROUND

The present invention relates generally to power generating systems connected to a grid and, more particularly, to control of power generating systems during weak grid operation.

Wind turbine generators are regarded as environmentally friendly and relatively inexpensive alternative sources of energy that utilize wind energy to produce electrical power. Wind turbines can be distinguished in two types: fixed speed and variable speed turbines. Conventionally, the variable speed wind turbines are controlled as current sources connected to a power grid. In other words, the variable speed wind turbines rely on a grid frequency detected by a phase locked loop (PLL) as a reference and inject a specified amount of current into the grid.

The conventional current source control of the wind turbines is based on the assumptions that the grid voltage waveforms are fundamental voltage waveforms with fixed frequency and magnitude and that the penetration of wind power into the grid is low enough so as to not result in disturbances. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency.

When wind turbines are located in a weak grid, wind turbine power fluctuations may lead to an increase in magnitude and frequency variations in the grid voltage. These fluctuations may adversely affect the performance and stability of the PLL and wind turbine current control. Therefore, it is desirable to determine a method and a system that will address the foregoing issues.

BRIEF DESCRIPTION

In accordance with one exemplary embodiment of the present invention, a power generating system is provided. The system includes a wind turbine and a converter to couple the wind turbine to a power grid. The system further includes a first controller for calculating voltage commands to emulate a phasor back electromotive force behind an inductance. The controller further generates converter switching commands based on the voltage commands. The voltage commands include a voltage magnitude reference, an internal frequency reference calculated from a power imbalance between an active power reference and the electrical power. The system also includes a second controller to limit a converter current.

In accordance with another exemplary embodiment a solar power generating system is provided. The solar power generating system includes a photovoltaic cell and a converter to couple the photovoltaic cell to a power grid. The system further includes a first controller for calculating voltage commands to emulate a phasor back electromotive force behind an inductance. The controller further generates converter switching commands based on the voltage commands. The voltage commands include a voltage magnitude reference, an internal frequency reference calculated from a power imbalance between a mechanical power reference and the electrical power. The system also includes a second controller to limit a converter current magnitude.

In accordance with yet another exemplary embodiment of the present invention, a method for supplying electrical power to a power grid is provided. The method includes generating the electrical power from an electrical source and controlling the electrical source to emulate a phasor back electromotive force behind an inductance. The method further includes limiting a converter current magnitude. In this method controlling the electrical source includes calculating voltage commands and using the voltage commands for generating converter switching commands, wherein the voltage commands include a voltage magnitude reference, an internal frequency reference calculated from an imbalance between a mechanical power reference and the electrical power.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide methods and systems to control grid connected power generating systems. It provides a voltage source controlled wind power generating system. Although the present discussion focuses on wind power generating system, the present invention is applicable to any power generating system with a controllable or uncontrollable input energy source and a power electronic converter interface.

Figure 1:
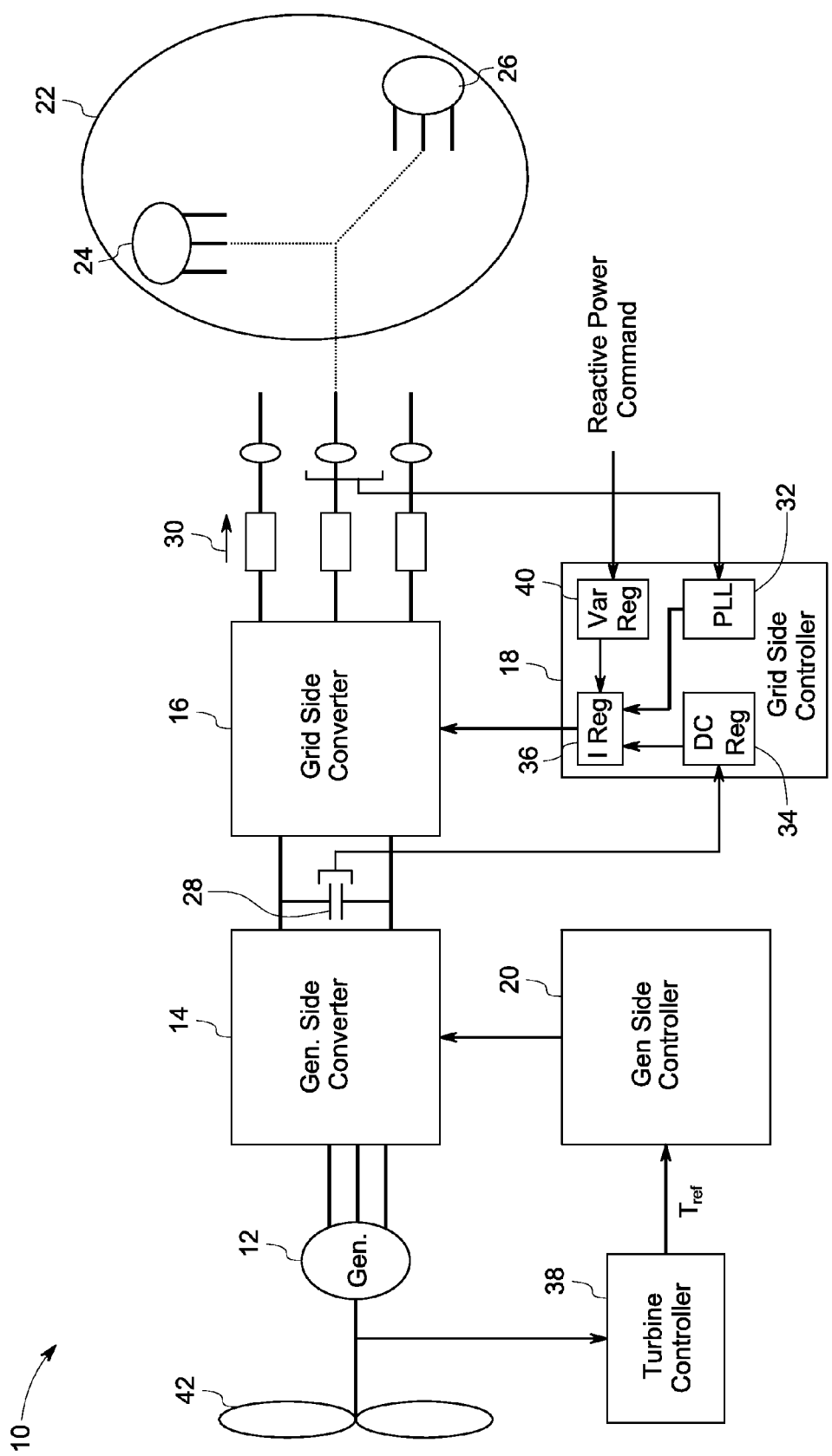
FIG. 1 is a diagrammatical representation of a conventional current source controlled wind power generating system connected to a power grid.

FIG. 1 shows a conventional grid connected wind power generating system 10 with current source control. The system includes a wind generator 12, a generator side converter 14 and a grid side converter 16. The system further includes a grid side controller 18, a generator side controller 20 and a power grid 22. The power grid 22 typically includes traditional synchronous generators 24 and electrical loads 26. A direct current (DC) link 28 connects the generator side converter 14 and the grid side converter 16. The generator side converter 14 converts alternating current (AC) power generated by the wind generator 12 into DC power. The grid side converter 18 then converts the DC power to AC power at a frequency compatible with the power grid 22.

The combination of the grid side controller 18 and grid side converter 16 functions as a current source for the grid 22. In other words, the grid side controller 18 controls the phase and amplitude of the output current 30 of grid side converter 16. The grid side controller includes a phase locked loop (PLL) 32, a DC voltage regulator 34, a current regulator 36 and a reactive power regulator 40. The PLL 32 senses three phase voltages of the power grid and generates a frequency and phase reference for the grid side converter 16. The DC voltage regulator 34 helps in maintaining the DC link voltage at a desired value, and the reactive power regulator 40 helps in supplying desired amount of reactive power into the grid. The current regulator 36 generates the output current reference for the grid side converter 16 based on the PLL output, the DC voltage regulator output, and the reactive power regulator output. The generator side controller 20 generates switching signals for the generator side converter 14. In one embodiment, a turbine controller 38 provides a torque reference to the generator side controller 20 based on wind velocity or rotor speed of the wind turbine. The turbine controller generates the torque reference such that maximum energy is captured from the wind.

The current source control of the wind power generating system 10 of FIG. 1 maintains the output current of the wind turbine 42 based on the frequency and phase of the grid voltage detected by PLL. However, when the wind turbine 42 is connected to a weak grid 22, or when the wind power penetration into the grid is very high, the output current will have significant impact on the grid voltage. Because the PLL is generating the output current reference based on the grid voltage and as the grid voltage is dependent on the output current itself, stability problems may occur. Stability issues may also occur because of the limited bandwidth of current source control. The current source control responds slowly to high frequency voltage distortions. Thus, in a current source control wind power generating system the output currents cannot always follow the grid voltage distortions due to grid network resonance conditions.

Figure 2:
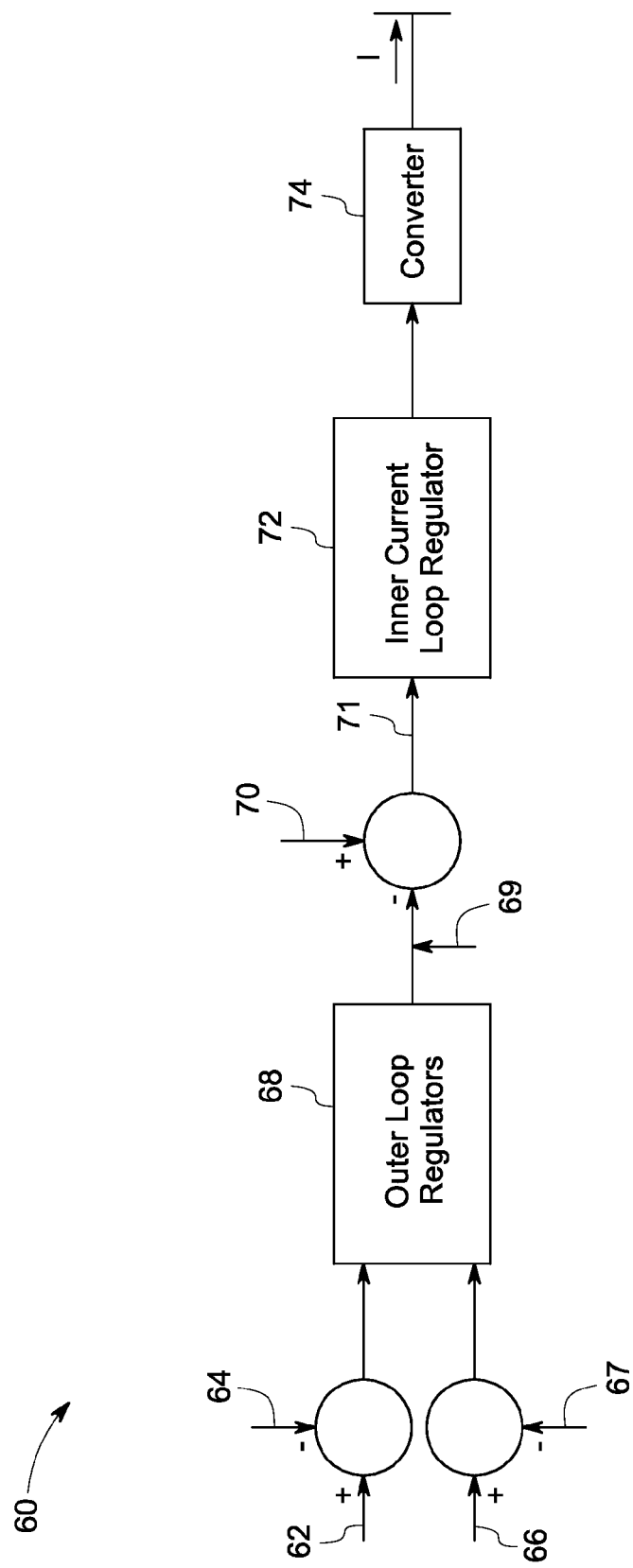
FIG. 2 is a diagrammatical representation of a control system of the wind power generating system of FIG. 1.

FIG. 2 shows a grid side converter control block diagram 60 of the wind power generating system of FIG. 1. A reference DC link voltage command 62, an actual DC voltage feedback 64, a reference reactive power command 66, and an actual reactive power feedback 67 are inputs to an output closed loop regulator 68. The outer closed loop control regulator 68 generates the reference current commands 69. A current feedback 70 is subtracted from the reference current commands 69 and then the error signals 71 are provided to an inner current loop regulator 72. The inner current loop regulator 72 provides switching signals to the grid side converter 74. As described earlier, the frequency and the phase reference for the current source are generated by the PLL 30 (FIG. 1). Thus, based on the input current commands 69 and the frequency reference, the grid side converter 74 injects the current into the grid.

Figure 3:
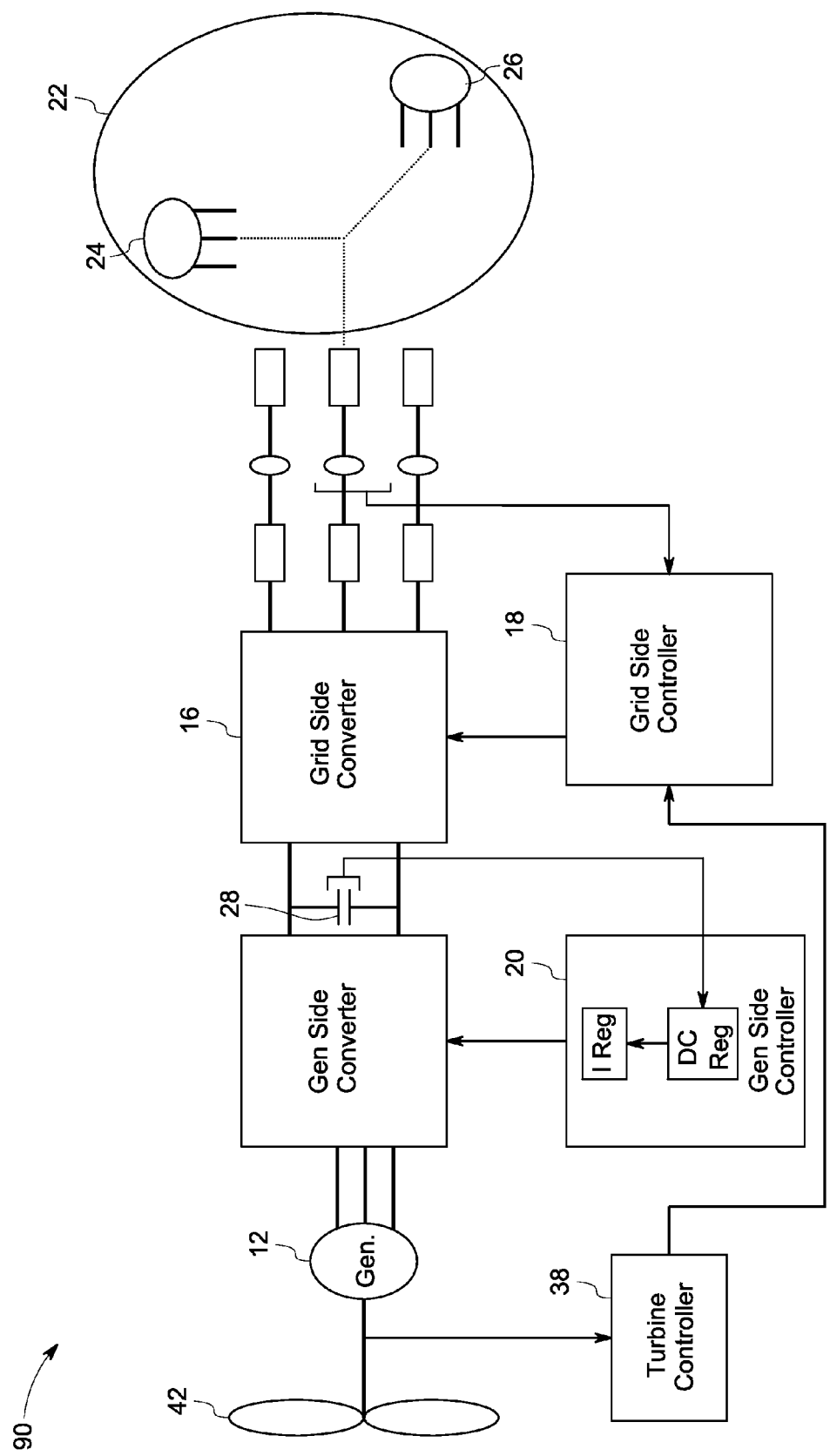
FIG. 3 is a diagrammatical representation of a voltage source controlled wind power generating system, in accordance with an embodiment of the present invention.

FIG. 3 shows a grid connected wind power generating system 90 with voltage source control in accordance with one embodiment of the present invention. The wind power generating system 90 includes the wind generator 12, the generator side converter 14, and the grid side converter 16. The system further includes the grid side controller 18, the generator side controller 20 and the power grid 22. In one embodiment, the wind generator 12 comprises a squirrel cage induction generator. In another embodiment, the wind generator 12 may comprise a synchronous generator or a permanent magnet synchronous generator.

The generator side controller 20 generates the switching signals for the generator side converter 14. In this embodiment, the generator side controller helps in maintaining the DC link voltage to a desired value. The grid side converter 16 is controlled as a voltage source connected to the grid 22. In other words, the grid side controller 18 controls the phase and amplitude of the output voltage of grid side converter directly. The grid side converter, when controlled as the voltage source, responds to grid changes as a voltage behind a reactance. Thus, the wind generator 12 operates in a similar manner as a synchronous generator. As compared to the grid side controller of FIG. 1, the grid side controller of the embodiment of FIG. 3 receives the power reference from the turbine controller 38. An internal frequency reference is generated based on the power imbalance between the reference power and the actual electrical power supplied to the grid. In one embodiment, a power/frequency (P/F) regulator (not shown) may be used to share the power with other wind turbines, i.e., for paralleling operation of wind turbines. The power frequency regulator determines the phase angle reference for the grid side controller 18.

Figure 4:
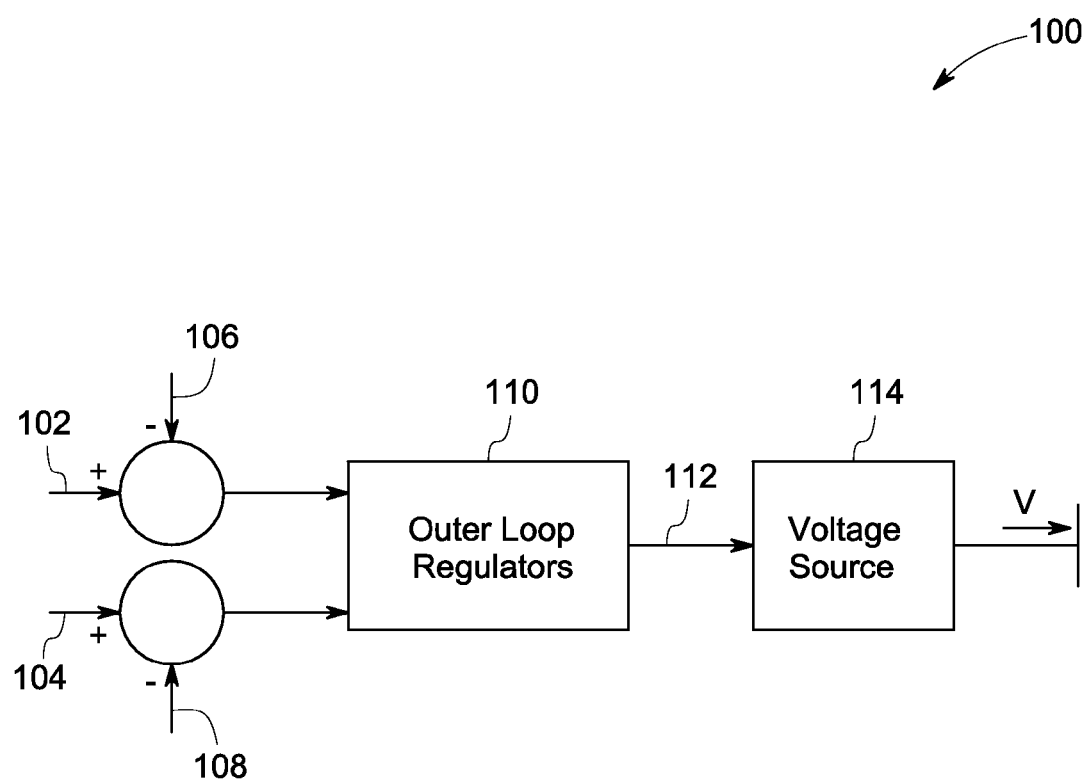
FIG. 4 is a diagrammatical representation of a wind turbine converter control of the wind power generating system of FIG. 3.

FIG. 4 shows a grid side converter control block diagram 100 of the wind power generating system of FIG. 3, in accordance with one embodiment of the present invention. A reference active power command 102 and a reference reactive power command 104 are inputs to an outer closed loop controller 110. A measured active power feedback 106 and a measured reactive power feedback 108 are also fed back to the outer closed loop regulator 110. The outer closed loop control regulator 110 generates the voltage commands 112 for a voltage source 114, and voltage commands 112 include both the magnitude command and frequency/phase command. In one embodiment, the voltage source 114 may include a second controller (not shown) to limit the converter current and the grid side converter 16 of FIG. 3. Thus, based on the input voltage commands 112 the voltage source 114 generates the output voltage and feeds the active power into the grid.

Figure 5:
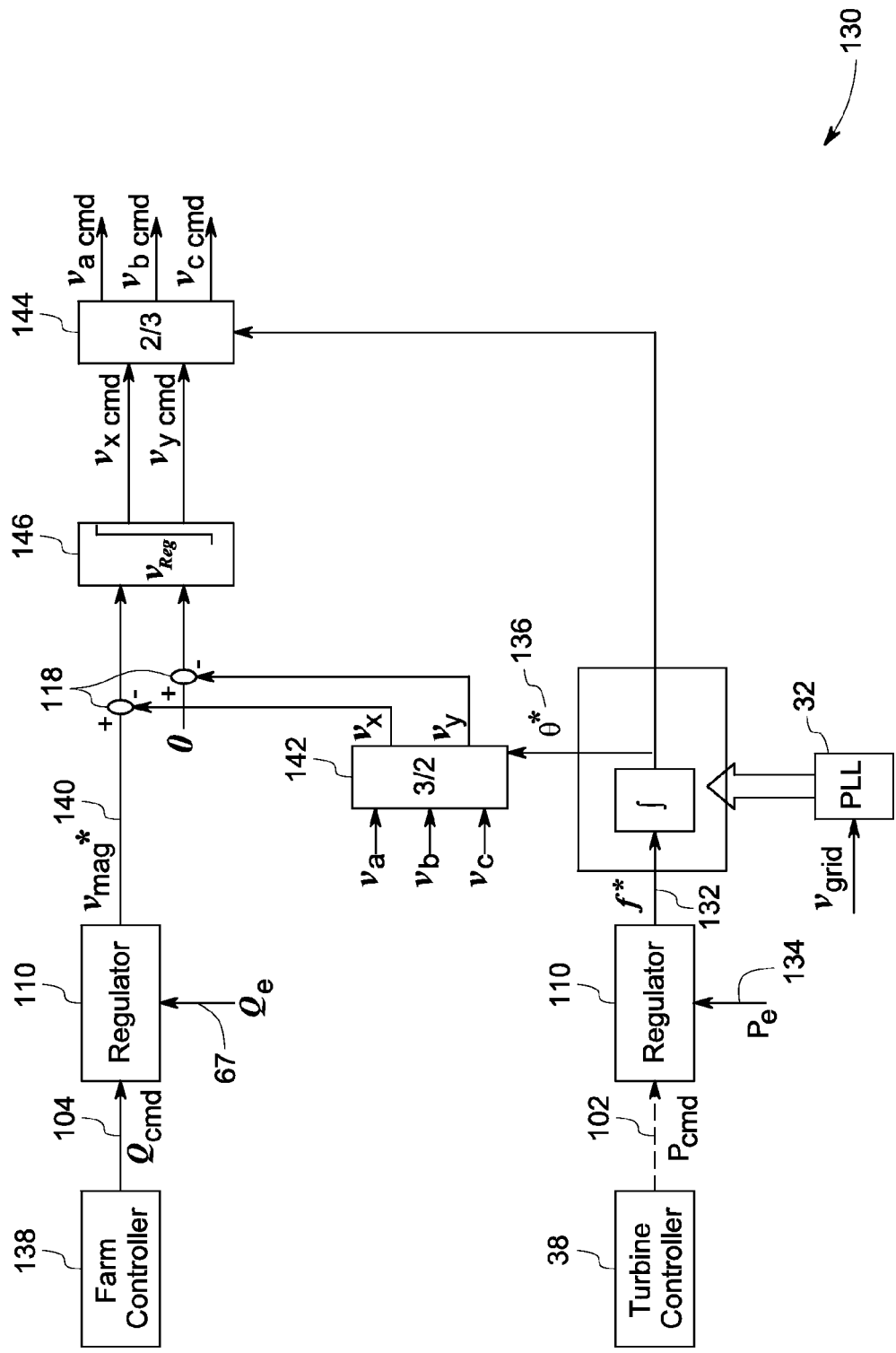
FIG. 5 is a diagrammatical representation of a detailed control system for a grid side converter, in accordance with an embodiment of the present invention.

FIG. 5 shows a detailed control system 130 for the grid side converter, in accordance with an embodiment of the present invention. The turbine controller 38 generates an active or mechanical power reference 102 or a mechanical power reference or a torque reference for the control system 130. An internal frequency reference 132 is generated based on the difference between or imbalance between the actual electrical power supplied to the grid 134 and the reference mechanical power 102. It should be noted here that the internal frequency reference 132 is different than the grid frequency. Further, a reference phase angle 136 for the control system 130 is generated by integrating the frequency reference 132. It should also be noted here that the PLL 32 is not used to generate the frequency reference or the phase reference. The PLL 32 is used only for protection purposes and ensures that the reference phase angle does not differ too much from the actual measured PLL angle. A farm controller 138 generates the reactive power reference 104 for the control system 130, and a reactive power regulator 110 generates voltage reference 140 for the control system 130. Thus, with this control system the grid side converter is controlled as a voltage source or controlled to emulate a back-electromotive force (EMF) behind an inductance. The EMF is controlled by the voltage magnitude reference 140 and the internal frequency reference 132. In one embodiment, control system 132 also includes an abc-xy transformation matrix 142 for voltage transformation.

The transformation matrix 142 converts 3-phase stationary quantities into 2-phase rotating quantities. The reverse transformation xy-abc matrix 144 converts the 2-phase rotating voltage coordinates into 3-phase stationary voltage coordinates. The voltage regulator 146 determines the voltage commands that need to be generated by the grid side converter. The benefit of this control system is the grid side converter responds to the load changes in grid very quickly, as the grid side converter is directly following voltage commands.

Figure 6:
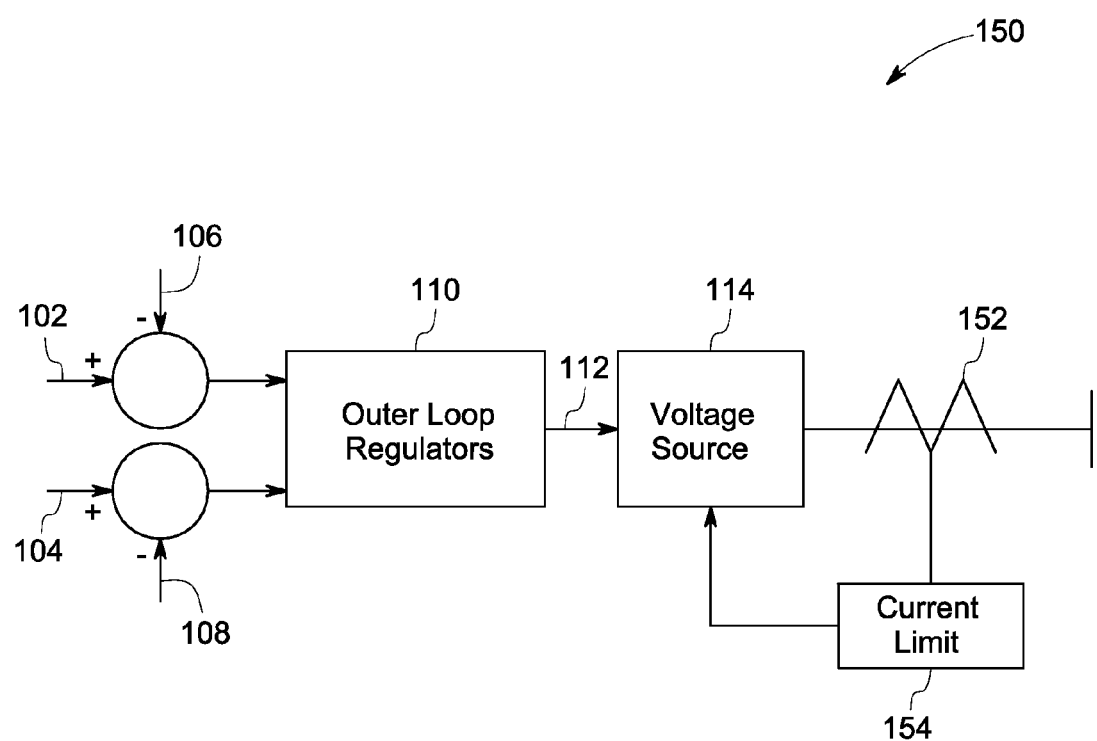
FIG. 6 is diagrammatical representation of a control system with a current limiter of the wind power generating system of FIG. 3.

FIG. 6 shows a control system 150 with a current limiter of the wind power generating system of FIG. 3, in accordance with one embodiment of the present invention. As described earlier, the voltage source controlled grid side converter 16 of FIG. 3 generates the voltage that follows the reference voltage commands. If there is no inherent current control, during grid transient or fault events the converter current may rise and exceed the current limit of switching devices of the converter. Thus, in one embodiment a current detector 152 and a current limiter 154 are used in the control system 150 to limit the converter current or to protect the converter. The current limiter 154 may be an instantaneous current limiter or a phasor current limiter or a combination of both. The instantaneous current limiter acts immediately and chops the current, whereas the phasor current limiter acts more slowly to limit the root mean square (RMS) current.

Figure 7:
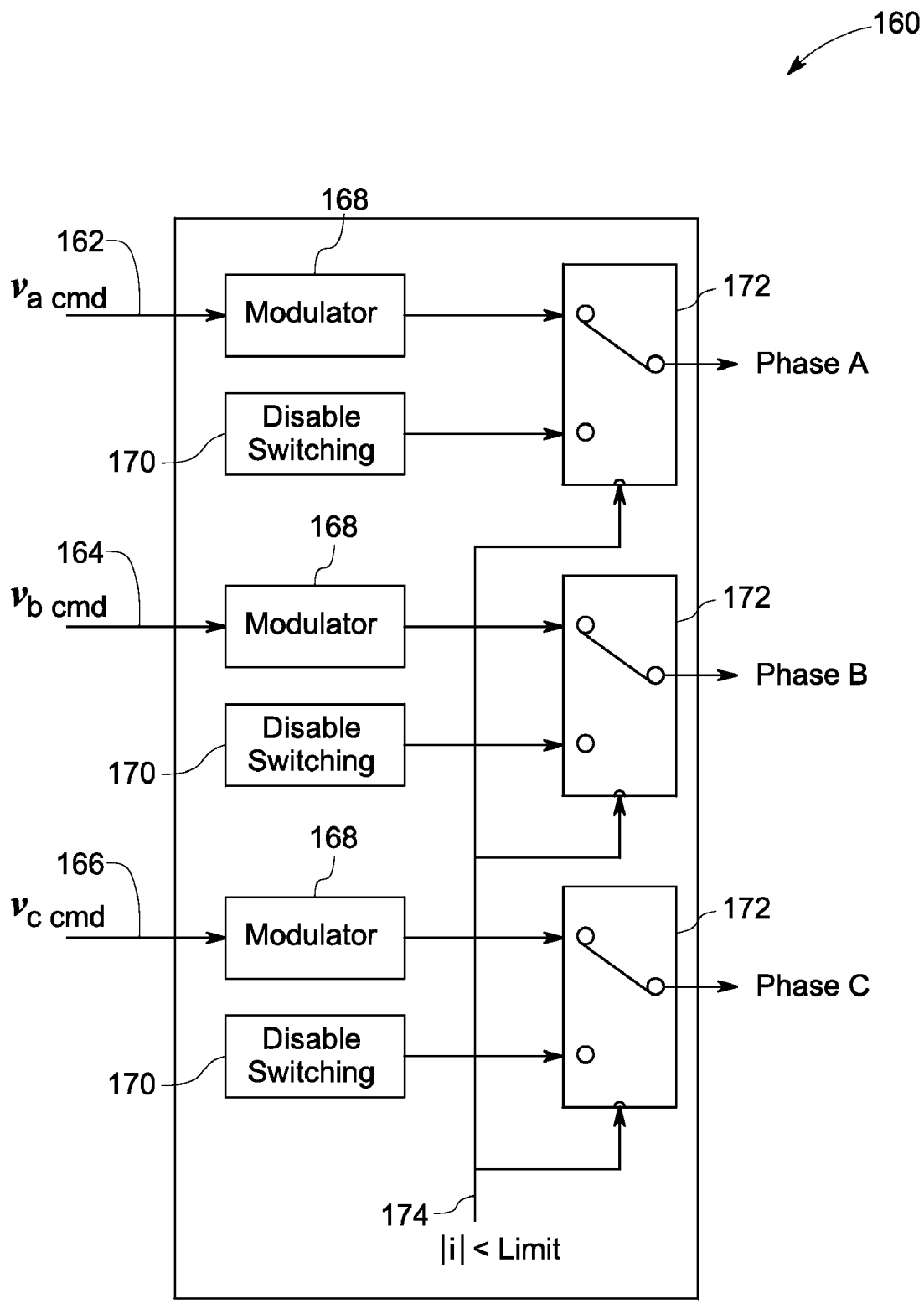
FIG. 7 is a diagrammatical representation of a instantaneous current limiter, in accordance with an embodiment of the present invention.

FIG. 7 is a block diagram of an instantaneous current limiter 160, in accordance with an embodiment of the present invention. The current limiter 160 receives three phase voltage commands 162, 164, 166 that the grid side converter needs to produce. For each command, a modulator block 168, a disable switching block 170 and a switch block 172 together generate switching signals for the respective switching devices of the grid side converter. A current detection signal 174 triggers the switch blocks 172 when the current is higher than a threshold value. In one embodiment, when the switch blocks 172 are triggered, the switching signals to the switching devices of the grid side converter are blocked. In one embodiment, the current detection signal is common for all the switching blocks. In other words, when any single-phase current exceeds the threshold value, it triggers all the switching blocks of all the three phases and blocks switching signals to the switching devices of the grid side converter. In yet another embodiment, three separate current detections signals trigger three separate switching blocks, and the three separate current detection signals are generated from three phase currents of the grid side converter. Thus, the current limiter 160 prevents over current in the grid side converter.

Figure 8:
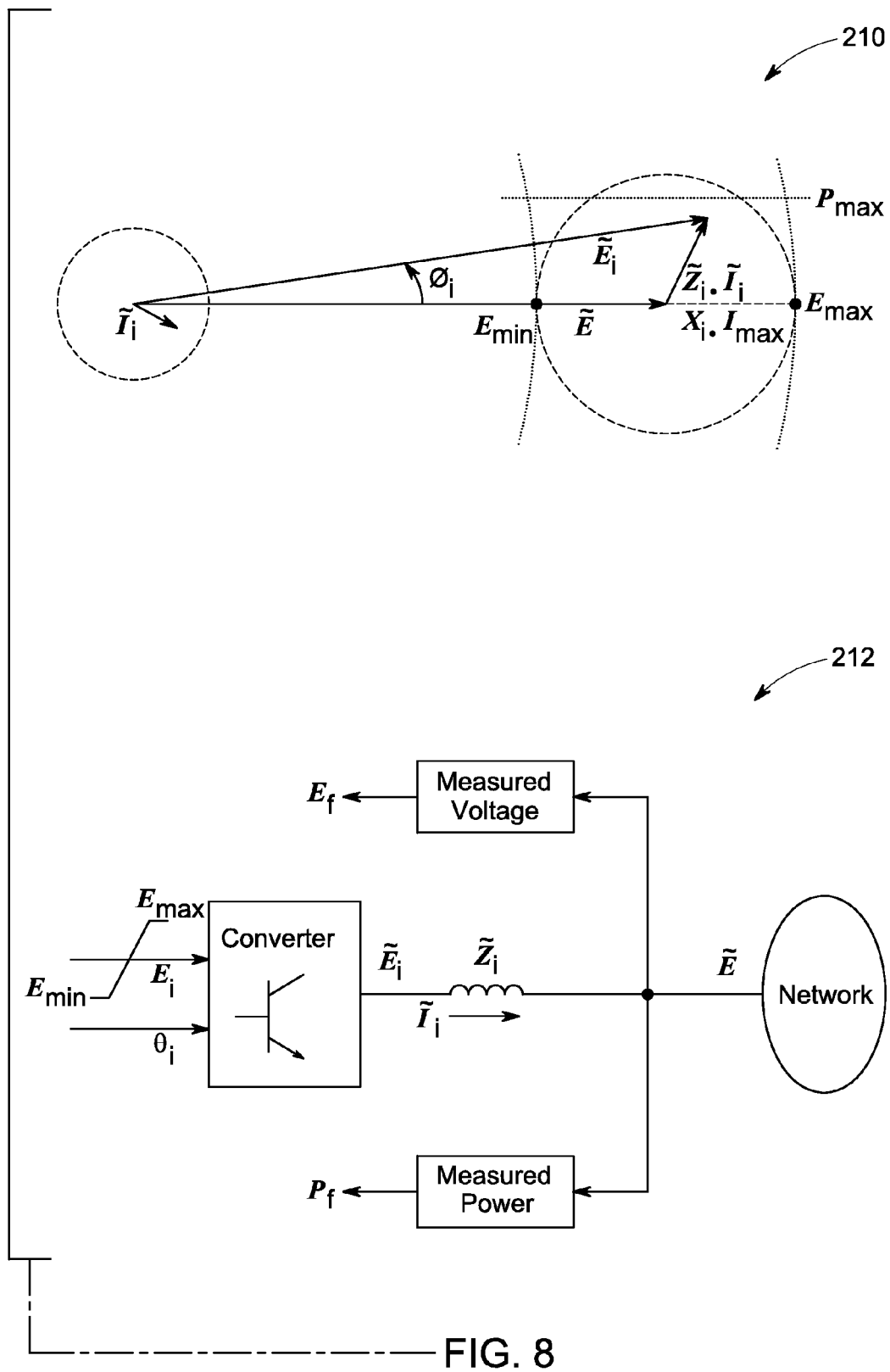
FIG. 8 is a phasor diagram representing an implementation of a phasor current limiter in accordance with an embodiment of the present invention.

FIG. 8 shows a phasor diagram 210 representing an implementation of a phasor current limiter in accordance with an embodiment of the present invention. For better understanding, the phasor diagram 210 is shown along with a grid side converter circuit 212 of a wind power generating system. The phasor diagram 210 shows, a grid side voltage $\tilde{E}$. An output voltage of the grid side converter $\tilde{E}_i$ is a vector sum of the grid side voltage $\tilde{E}$ and an impedance voltage drop $\tilde{Z}_i\tilde{I}_i$ across a known impedance $\tilde{Z}_i$ associated with the wind turbine converter. The phasor diagram 210 also shows a current $\tilde{I}_i$ injected into the grid by the grid side converter. The current $\tilde{I}_i$ lags the voltage grid side voltage $\tilde{E}$ as shown in phasor diagram 210. The grid voltage $\tilde{E}$ further lags the output voltage of the grid side converter $\tilde{E}_i$ by an angle $\theta_i$. The phasor current magnitude $\tilde{I}_i$ can be managed by limiting the voltage drop (magnitude and angle) across the impedance $\tilde{Z}_i$. In the grid side converter circuit 212 $E_f$ is a measure of $\tilde{E}$ and is a filtered quantity to eliminate the ripple components. Similarly, $P_f$ is a measure of the active power. The converter internal voltage limits ($E_{min}$ and $E_{max}$) are calculated from the known current limit value $I_{max}$ and an estimated converter reactance $X_i$. In the phasor diagram 210, $I_{max}$ represents maximum output of the current limit regulator 154 of FIG. 6. The phasor current magnitude limit is achieved by keeping $\tilde{E}_i$ within the dashed circle i.e., the circle formed by $E_{min}$ and $E_{max}$. It should be noted that $E_{max}$ and $E_{min}$ are only rough boundaries to keep $\tilde{E}_i$ within the dashed circle. In one embodiment, to precisely limit the current, a current limit regulator is used. The angle limit is achieved by adjusting a power limit $P_{max}$. At rated voltage, the active power $P_f$ is limited to $P_{max}$ by keeping $\tilde{E}_i$ below the dotted $P_{max}$ line. In one embodiment, the power limit $P_{max}$ is a fixed value. In another embodiment the power limit $P_{max}$ is a function of $I_{max}$. In yet another embodiment, during islanding mode when a current or power limit is reached, the phase angle is decreased.

In the phasor diagram 210 the dashed circle defines the maximum permissible steady-state phasor voltage drop across the converter impedance. The voltage and power limit values (dotted lines) are calculated from following equations:

$$E_{min} = E_f - X_i I_{max} \quad (1);$$

$$E_{max} = E_f + X_i I_{max} \quad (2);$$

$$P_{max} = H_p(I_{max}) \quad (3);$$

However, the calculation is only approximate since it neglects the resistive component, impedance tolerance, and system frequency. In one embodiment, to address these errors, an active regulator loop is closed on $I_{max}$ to precisely control for the desired current limit value. In the case where $X_i$ is not accurately known, controlling the difference in voltages will not distinguish between correct $X_i I_{max}$ and incorrect $X_i$ paired with a compensating incorrect $I_{max}$.

In one embodiment, the voltage source control of present invention is applied in a doubly fed asynchronous generator system. In this embodiment, the grid-side converter maintains the DC link voltage, and the generator-side converter is controlled as a voltage source behind an inductance. In this embodiment, the generator-side active rectifier converts variable-frequency AC power into DC power, and the grid-side converter is controlled as a voltage source behind an inductance.

The voltage source control of the present invention is also useful in islanding operation. The application of power sources to island-able power grids can suffer poor dynamics resulting from current control temporarily defeating the voltage output. This can be a detriment when a load suddenly requires a change in current to remain at the same voltage. Loads can be susceptible to even temporary voltage changes. While the system control would prefer voltage magnitude and frequency in favor of active and reactive power, so long as sufficient power is available, removing the imbedded current regulation from the normal transient load response can provide this.

As will be appreciated by those of ordinary skill in the art, even though the above discussion focuses on wind power generating system, the control method can also be used in other uncontrollable power generating systems connected to the power grid such as photovoltaic systems or fuel cell systems. In such power generating systems, the grid side converter may also be operated as voltage source controlled converter.

Figure 9:
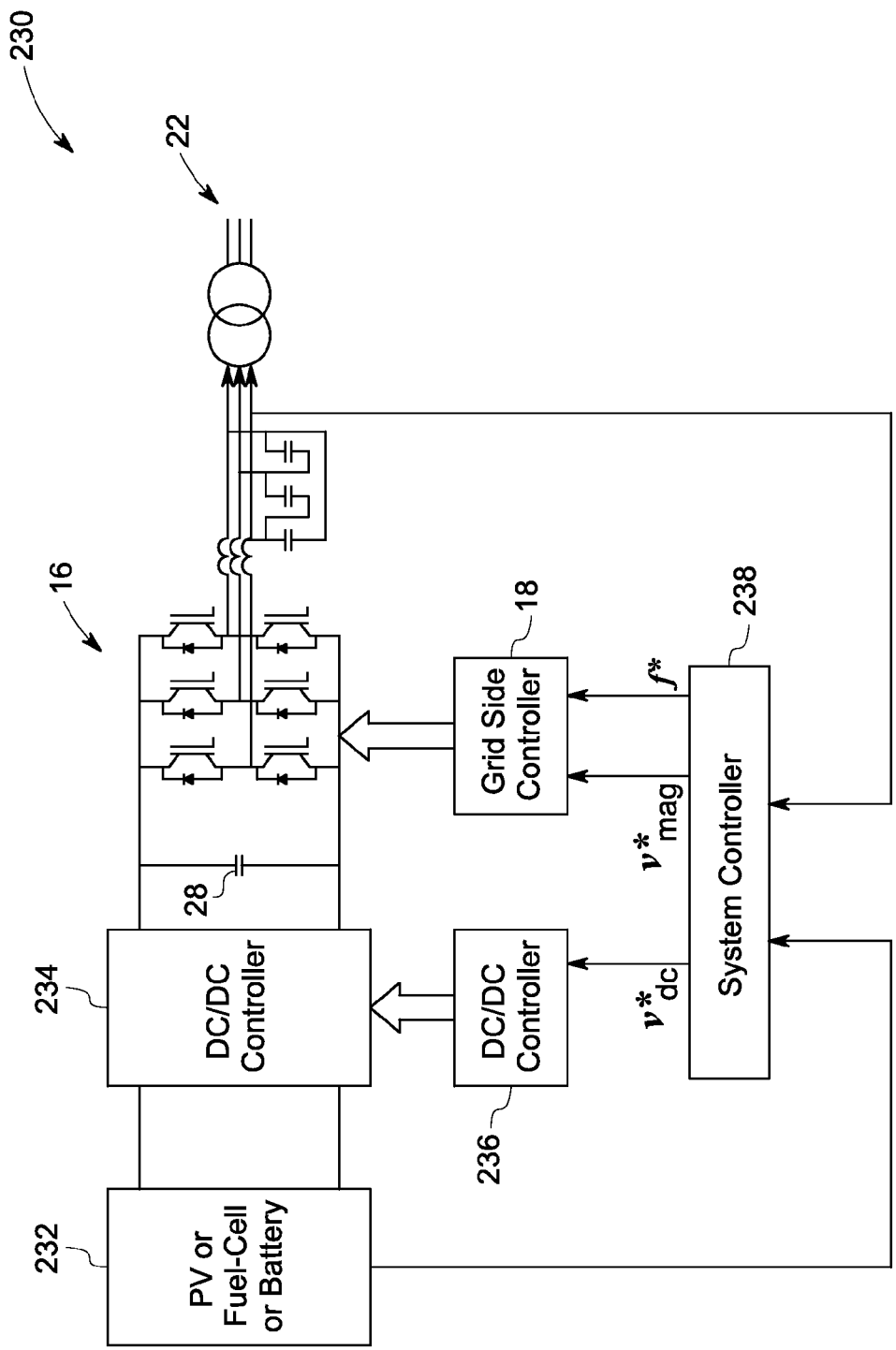
FIG. 9 is a diagrammatical representation of another power generating system embodiment wherein the control system of present invention is implemented.

FIG. 9 shows an embodiment of a power generating system 230, wherein the control system of present invention is implemented. The power generating system includes an electrical source 232 connected to the power grid 22. In one embodiment, the electrical source may be a photovoltaic cell or a fuel cell or a battery. The electrical source is connected to the grid through a DC/DC converter 234, the DC link 28 and a grid side converter 16. The DC/DC converter 234 maintains a constant DC voltage at the DC link 28 by controlling the energy flow from the energy source 232 to the power grid 234. The DC/DC converter 234 is controlled by a controller 236. The grid side converter 16 is controlled as a voltage source connected to the grid 22. In other words, as explained earlier with respect to the wind power generating system, the grid side controller 18 controls the phase and amplitude of the output voltage of grid side converter directly. The system controller 238 generates a reference DC voltage command, a reference output voltage magnitude command, and a reference frequency command for the DC/DC converter 234 and grid side converter 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generating system comprising
a wind turbine;
a converter configured to couple the wind turbine to a power grid;
a first controller configured for calculating voltage commands to emulate a phasor back electromotive force, the controller further configured for using the voltage commands for generating converter switching commands, wherein the voltage commands include a voltage magnitude reference, an internal frequency reference calculated from an imbalance between an active power reference and an actual electrical power; and
a second controller configured to limit a converter current.

2. The system of claim 1, wherein the wind turbine comprises a squirrel cage induction generator.

3. The system of claim 1, wherein the wind turbine comprises a doubly-fed asynchronous generator.

4. The system of claim 1, wherein the internal frequency reference is different than a power grid frequency.

5. The system of claim 1, wherein the active power reference is generated by a turbine controller.

6. The system of claim 1, wherein the voltage magnitude reference is generated from a reactive power controller.

7. The system of claim 1, wherein second controller comprises an instantaneous current controller, a phasor current limit controller, or a combination thereof.

8. The system of claim 7, wherein the instantaneous current limit controller is configured to block switching signals to switching devices of the converter when the current exceeds a threshold value.

9. The system of claim 7, wherein the phasor current limit controller is configured to limit a phasor current by adjusting a voltage drop across a converter impedance.

10. The system of claim 1, wherein the voltage commands further include a phase angle command.

11. The system of claim 10, wherein the phase angle command is calculated from an integration of the internal frequency command.

12. A solar power generating system comprising
a photovoltaic cell;
a converter configured to couple the photovoltaic cell to a power grid;
a first controller configured for calculating voltage commands to emulate a phasor back electromotive force, the controller further configured for using the voltage commands for generating converter switching commands, wherein the voltage commands include a voltage magnitude reference, an internal frequency reference calculated from an imbalance between an active power reference and an actual electrical power; and
a second controller configured to limit a converter current.

13. The solar power generating system of claim 12, wherein the converter comprises a DC to DC converter, DC to AC converter, or a combination thereof.

14. The system of claim 12, wherein the first controller is configured for calculating a phase angle reference by integrating the internal frequency reference.

15. The system of claim 12, wherein the current limit controller comprises an instantaneous current controller, a phasor current limit controller, or a combination thereof.

16. A method of supplying electrical power to a power grid comprising:
generating the electrical power from an electrical source;
controlling the electrical source to emulate a phasor back electromotive force; and
limiting a converter current magnitude;
wherein controlling the electrical source comprises calculating voltage commands and using the voltage commands for generating converter switching commands, wherein the voltage commands include a voltage magnitude reference, an internal frequency reference calculated from an imbalance between a active power reference and the electrical power.

17. The method of claim 16, wherein controlling the electrical source comprises calculating a phase angle reference.

18. The method of claim 17, wherein calculating the phase angle reference comprises integrating the internal frequency reference.

19. The method of claim 16, wherein limiting the converter current magnitude comprises adjusting a voltage drop across a converter impedance.

20. The method of claim 16, wherein limiting the converter current magnitude comprises blocking switching signals to switching devices of the converter when the current exceeds a threshold value.

* * * * *